Dec. 27, 1938. J. V. SCHAFER 2,141,726

FISHING REEL

Filed May 2, 1935

Inventor:
John V. Schafer
By Freeman, Sweet, Albrecht & Weidman
Attorneys

Patented Dec. 27, 1938

2,141,726

UNITED STATES PATENT OFFICE 2,141,726

FISHING REEL

John V. Schafer, Bronson, Mich., assignor to Bronson Reel Company, Bronson, Mich., a corporation of Michigan Application May 2, 1935, Serial No. 19,364

10 Claims. (Cl. 242—84.4)

My invention relates to fishing reels and includes among its objects and advantages an improvement in the durability and smooth running of the level wind mechanism for such a reel, and an improved method of manufacturing certain of the parts for the level wind mechanism.

Figure 1:
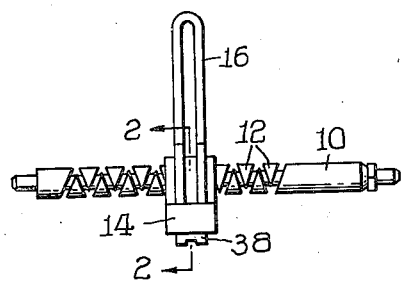
Figure 1 is a side elevation of a level wind drive.

In the embodiment of the invention selected for illustration, the drive comprises the conventional drive shaft 10 having reversing threads 12 formed therein and driven by the conventional gearing (not shown). The carriage 14 carries the usual line guide loop 16 and has a horizontal bore at 18 to receive the shaft 10 and a vertical bore at 20, the axis of which intersects the axis of the bore 18 at right angles. The pawl has a cylindrical body member 74 rotatably supported in the bore 20. Duplicate actuator portions 82 and 84 extend from opposite ends of the body 74 for selective engagement with the threads 12.

I have illustrated a double ended pawl held in place by the hemi-spherical portion of the plate 36, which rides against the middle of the blade 82. The plate 36 is fastened in place by the set screw 38.

Figure 3:
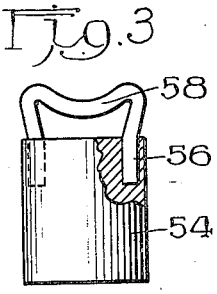
Figure 3 is a side elevation, partly in section, of a modified construction.
Figure 2:
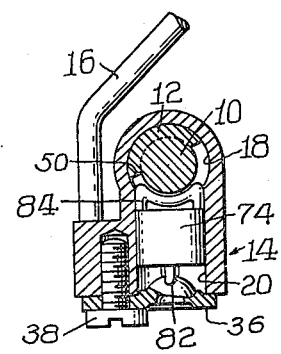
Figure 2 is a section on line 2—2 of Figure 1.

Referring now to Figure 3, the body 54 is drilled to receive the ends 56 of a length of hardened wire bent into a U-shape with the legs 56 driven into the body 54 to assemble the parts, and the bight at 58 reversely curved to the proper radius to fit the threads 12. In assembled position, as shown, the legs 56 include the straight lower portions, embedded in the body 54, and the slightly divergent riser portions extending up to the ends of the bight 58. I find that such a shape is very effective in guiding the actuator blade across the intersections of the threads 12. Such a construction makes it possible to use hardened wire for the blade, or wire of a different metallurgical composition from the body of the pawl. For instance, incorrodible materials such as nickel silver, Tobin bronze, or stainless steel, will be materially welcomed by salt water fishermen.

Figure 4:
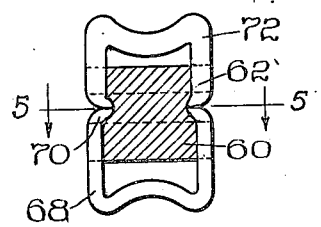
Figure 4 is a section on line 4—4 of Figure 5.
Figure 5:
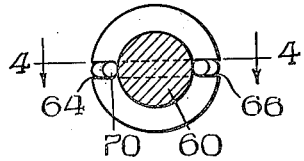
Figure 5 is a section on line 5—5 of Figure 4, showing a double ended pawl with wire inserts for blades.

Referring now to Figures 4 and 5, the body 60 has a central annular groove at 62 and broached side grooves at 64 and 66 debouching centrally into the deeper groove 62. The blade, or actuator 68, may have a thread-engaging portion identical with the blade of Figure 3, but the ends of its legs are turned in as at 70 to snap into the groove 62, being inserted into final position by axial movement sliding down the grooves 64 and 66.

The actuator 72 is similarly formed and inserted from the opposite end. In such a construction as Figures 4 and 5 it is possible to make one of the actuators one-thousandth of an inch or so larger than the other, the smaller actuator being of the proper size to fit the diamond threads 12 perfectly when the reel is new. After an extended period of use, when the actuator 68 has become too worn to function properly, the reversal of the pawl to bring the actuator 72 into engagement with the threads 12 will occur at a time when the threads 12 themselves have been enlarged by wear, so that the thicker wire in the actuator 72 will fit the worn threads almost as perfectly as the smaller actuator 68 fitted them when the reel was new.

When I make up such a pawl with the actuators of different sizes, I prefer to form one end of the body 60 a little longer than the other. In other words, I do not position the grooves 62 exactly in the center of the body. This enables the person assembling the reel to tell which is the normal sized actuator and which is the oversized actuator and make the initial assembly with the normal sized actuator in engagement with the threads 12. The difference between the sizes of the actuators is so small that it would be difficult to distinguish between them with the naked eye, but the slight asymmetry of the body is easily noticeable to an experienced person and facilitates assembly. In the drawing I have exaggerated the difference in size referred to, and indicated the actuator 72 as being slightly larger than the actuator 68.

Figure 6:
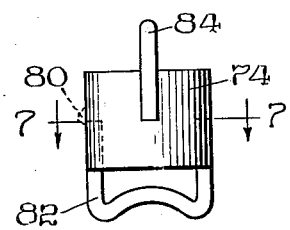
Figure 6 is a side elevation of the wire insert pawl with the blades at right angles, illustrated in Figure 2.
Figure 7:
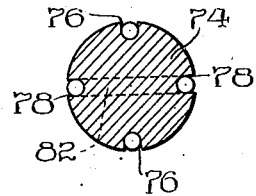
Figure 7 is a section on line 7—7 of Figure 6.

In Figures 6 and 7 the body 74 has a pair of grooves 76 broached in from one end to the middle, and another pair 78 broached in from the other end to the middle. The pairs of grooves are not located in the same plane, so that the end of each groove is defined by solid metal. In the original broaching, a bulge will form at the end of the slot as indicated in dotted lines at 80 in Figure 6, which bulge can readily be removed by passing the body through a finishing die. This construction not only provides a less expensive method of manufacture than the drilling of holes as in Figure 3, but the location of the actuators 82 and 84 in planes at right angles to each other lets each actuator function as an extension of the bearing surface of the body 74 to carry the twisting load in use.

It will be obvious that the actuators of Figure 6 could differ in size as described in connection with Figure 4, and that the actuators of Figure 4 could be positioned in planes at right angles to each other as in Figure 6.

Without further elaboration the foregoing will so fully explain my invention that others may, by applying knowledge current at the time of application, readily adapt the same for use under various conditions of service.

I claim:

1. A level wind drive for fishing reels, comprising: an actuator made of an elongated element having a working portion bent to fit an actuating element and movable in sliding contact therewith, and end portions extending in parallelism away from the ends of said working portion; a body apertured to receive said end portions; a carriage receiving and rotatably supporting said body, said carriage having a bore about an axis normal to and intersecting the axis of rotation of said body; and an actuating element in the form of a drive shaft lying in said bore and supporting and guiding said carriage, said actuating element having threads formed therein to engage said actuator.

2. In a level wind mechanism for fishing reels of the type employing a diamond-threaded shaft and a carriage mounted to slide parallel to the axis of said shaft: a drive connection between said shaft and carriage comprising a body journaled in said carriage for rotation about an axis intersecting the shaft axis; and an elongated U-shaped actuator having its legs entered in said body and its bight curved to conform to the thread channel in said shaft.

3. A combination according to claim 2 in combination with a duplicate U-shaped actuator formed of a separate piece of material and mounted in the opposite end of said body.

4. A combination according to claim 2 in combination with a duplicate U-shaped actuator mounted in the opposite end of said body.

5. A combination according to claim 2, in combination with another U-shaped actuator mounted in the opposite end of said body and of slightly larger dimensions than said first actuator, to fit said threads after wear between said first actuator and said threads has enlarged said threads.

6. A combination according to claim 2, in combination with another U-shaped actuator mounted in the opposite end of said body and of slightly larger dimensions than said first actuator, to fit said threads after wear between said first actuator and said threads has enlarged said threads, said body being asymmetrical to enable the assembler to distinguish between the ends carrying the normal and oversize actuators.

7. A pawl for the level wind mechanism of a fishing reel, comprising a body having oppositely spaced slots in its sides parallel to the body axis, and an elongated U-shaped member having its legs entered in said slots and its bight curved to fit a diamond-thread drive shaft, the ends of said legs having abutment with said body to resist longitudinal movement of said legs in said slots.

8. A pawl for a fishing reel of the type employing a diamond-thread level wind mechanism, comprising a body, an actuator projecting from one end of said body and a larger actuator projecting from the other end of said body.

9. A pawl for a fishing reel of the type employing a diamond-thread level wind mechanism, comprising a body, an actuator projecting from one end of said body and a larger actuator projecting from the other end of said body, the opposite ends of said body being of different shape to enable the user to distinguish between the small and large actuators.

10. A pawl for the level wind mechanism of a fishing reel comprising, in combination: a cylindrical body having holes in its end parallel to its own axis and set in from the periphery of said body; and an elongated actuator having end portions entered in said holes; said actuator including a central U-shaped portion shaped to fit a diamond-threaded shaft, and risers connecting said U-shaped portion to said end portions, said risers diverging adjacent said U-shaped portion to substantially the full diameter of said body.

JOHN V. SCHAFER.